Figure 1:
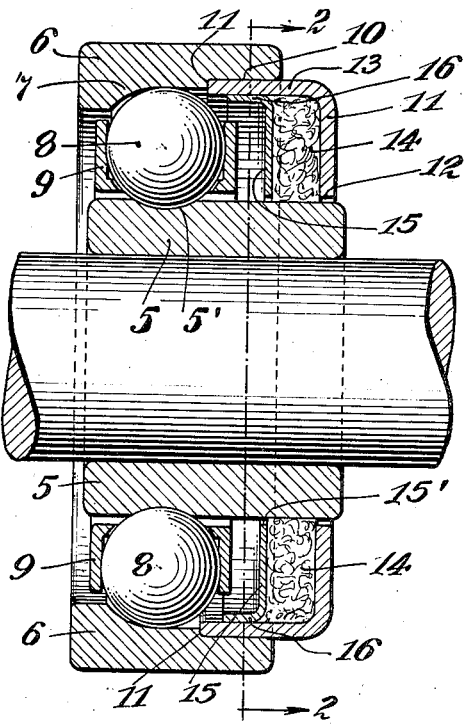

Aug. 9, 1932.  G. R. BOTT  1,871,033

ANTIFRICTION BEARING

Filed Feb. 6, 1930

INVENTOR
George R. Bott
BY C. P. Goepel
his ATTORNEY

Patented Aug. 9, 1932

1,871,033

UNITED STATES PATENT OFFICE

GEORGE R. BOTT, OF STAMFORD, CONNECTICUT, ASSIGNOR TO NORMA-HOFFMANN BEARINGS CORPORATION, OF STAMFORD, CONNECTICUT, A CORPORATION OF NEW YORK

ANTIFRICTION BEARING

Application filed February 6, 1930. Serial No. 426,253.

This invention relates to anti-friction bearings, and more particularly to bearings of that type, which are of more or less recent development in the art and are generally known as grease packed or self-lubricating bearings.

It is one of the important objects of the present invention to provide a lubricant holding or retaining means as a component part of a ball bearing unit of the open type, such as that disclosed in my co-pending application Serial No. 243,301, filed December 29, 1927, and in which there is embodied as a part of the lubricant retaining means, means which also acts to retain the outer race ring of the bearing in assembled relation with respect to the inner race ring and to the anti-friction bearing elements or balls arranged therebetween.

It is also an additional object of the invention to provide a lubricant retaining and sealing means which is easily and quickly applicable to the outer race ring at one side of the bearing to confine a body of grease between the race rings and in contact with the bearing elements and exclude the entrance of dust or dirt to said space.

In one embodiment of my present improvements, the lubricant retaining means includes a pressed or drawn cup-shaped member of sheet metal within which a sealing gasket is confined for contact upon the periphery of the inner race ring by a metal washer pressed into said cup, the cylindrical wall of the cup at the open end thereof being resiliently yieldable and forced under pressure into a shallow counterbore provided at one end of the outer bearing ring. The end edge of said cup wall contacting with the shoulder thus formed on the inner face of the ring is in closely contiguous relation to the balls engaged with the race of said bearing ring, thus limiting axial shifting movement of the outer ring and retaining the same in assembled relation with the inner ring and the balls as a complete unit ready for application to its operative position with respect to the bearing support of the machine to which the device is to be applied. It will thus be seen that I provide in a very simple structure, a means which serves the double purpose of retaining the parts of an open type bearing in properly assembled relation to be handled as a unit and for also completely sealing the space between the race rings at one side of the bearing and retaining a body of lubricating grease therein.

With the above and other objects in view, the invention consists in the improved antifriction bearing and in the form, construction and relative arrangement of its several parts as will be hereinafter more fully described, illustrated in the accompanying drawing, and subsequently incorporated in the subjoined claims.

In the drawing, wherein I have illustrated one simple and practical embodiment of the invention, and in which similar reference characters designate corresponding parts throughout the several views,—

Figure 2:
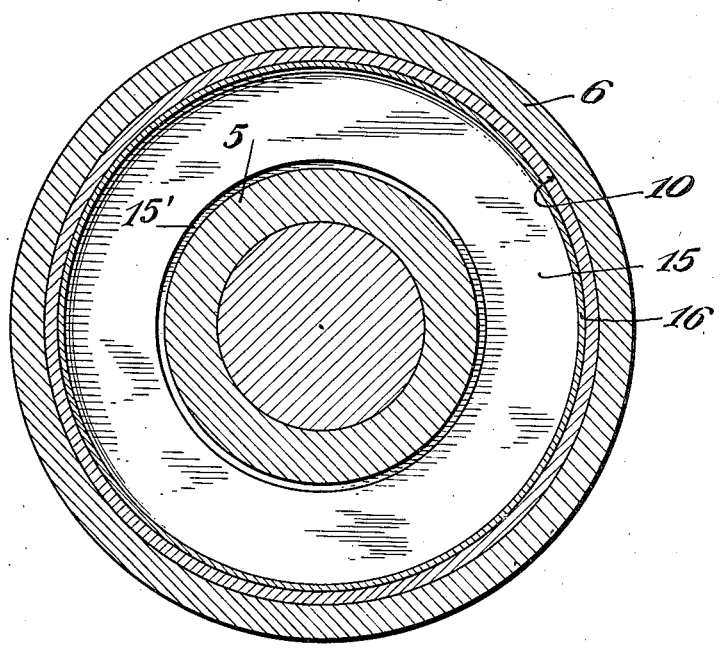

Figure 1 is a diametrical section of an open type ball bearing illustrating one practical embodiment of my present improvement, and Figure 2 is a sectional view thereof taken on the line 2—2 of Fig. 1.

Referring in detail to the drawing, the bearing as therein shown includes an inner ring 5 and an outer ring 6, said inner ring having the usual closed race 5' and the outer ring having a race 7 open at one side, as is usual in bearings of the open or separable type so that the said outer ring may be moved axially over the row of balls 8 positioned in the race 5' of the inner ring so as to engage said balls at their outer surfaces upon the race 7. In the present instance, I have shown the bearing balls 8 mounted for individual rotation within a suitable cage indicated at 9.

The relatively thin wall section of the outer bearing ring 6 at the open side of the race 7 is provided with a shallow counterbore indicated at 10, resulting in the formation of a narrow annular shoulder 11 in the inner face of the ring at a point closely adjacent to the bearing balls 8.

The sealing and lubricant retaining means includes a drawn or stamped sheet metal cup 11, the body wall of which is provided with a central opening 12. The outer cylindrical wall 13 of this cup is of a greater depth than the depth of the counterbore 10 in the race ring 6. It will be noted that the inner race ring 5 is of appreciably greater width than the outer ring 6 and extends laterally at one of its ends beyond the end of the ring 6 having the counterbore 10 therein.

Within the cup shaped retainer member 11, the sealing gasket 14 of felt or other suitable material is placed, said gasket being closely confined between the radially disposed body wall of the cup and a sheet steel washer 15. This washer at its outer edge is provided with an angularly disposed flange 16 so that the said washer likewise is in the form of a relatively shallow cup. This washer is forced under pressure within the cup shaped member 11, the flange 16 thereof being resiliently pressed inwardly and, owing to its tendency to resume its normal condition, having tight frictional contact with the inner face of the cylindrical wall 13 of the cup. The opening 15' of the annular washer plate 15 is of approximately the same diameter as the opening 12 in the body wall of the cup 11.

After the parts 11, 14 and 15 have been assembled as above described, the cylindrical wall 13 of the cup 11 is then forced under pressure within the counterbore 10 of the outer bearing ring 6. As this wall 13 of the cup extends beyond the washer plate 15, in forcing the cup wall into the bearing ring 6, said wall will be slightly contracted and by its inherent resiliency, will therefore, exert an outward frictional pressure against the wall of the counterbore 10. It will be observed that the thickness of the cup wall 13 is greater than the depth of the shoulder 11 so that when the end edge of said wall is in contact with the shoulder as shown in Fig. 1, said edge will project inwardly from the face of the bearing ring 6. Accordingly, said cup wall by contact with the bearing balls 8 will limit the axial shifting movement of the ring 6 in a direction which would otherwise result in the disengagement of said bearing ring from contact with the balls 8. It will of course, be understood that before or after the retaining means is thus assembled with the outer bearing ring, the space between the opposed faces of the inner and outer rings at one side of the balls 8 is packed or filled with lubricating grease of suitable consistency. After the retaining and sealing means has been applied, it will be noted that the laterally extending end portion of the inner bearing ring 5 projects through the opening 12 in the wall of the retainer cup 11. The edge of this opening, as well as the edge of the opening 16 in the washer plate 15, is in clearance relation or out of contact with the peripheral face of the inner bearing ring 5 while the felt sealing gasket 14 has contact upon said surface of the bearing ring, and thus precludes the possibility of any grit or dirt entering through said openings into the interior of the bearing.

From the foregoing description considered in connection with the accompanying drawing, the construction and several advantages of the illustrated embodiment of the invention will be clearly understood. It will be apparent that a sealing and lubricant retaining device of this kind can be fabricated at very low cost, and also enables said means together with the several parts of the bearing to be rapidly and correctly assembled in the form of a composite unit so that the bearing units may be shipped from the factory packed with the grease or lubricant, and can be kept in stock for an indefinite period of time with the assurance of the highest degree of operating efficiency when the bearing is applied to actual use. I have disclosed herein a particular form of the retainer cup and means for confining the sealing ring or gasket therein as well as the particular construction of the outer bearing ring for the attachment of said retainer cup thereto. It will however be understood that in these as well as other detail features of my present disclosure the invention is susceptible of embodiment in various other alternative mechanical structures and I therefore reserve the privilege of resorting to all such legitimate changes therein as may be fairly embodied within the spirit and scope of the invention as claimed.

I claim:

1. In an open type anti-friction ball bearing, inner and outer bearing rings having races in their opposed faces, bearing balls engaged with said races, the race of the outer bearing ring being open on one side, and the inner face of said ring adjacent to the open side of the race having an annular shoulder thereon, and means for retaining a body of lubricant between the bearing rings at one side of the balls embodying a sheet metal retainer having an annular flange extending within the outer bearing ring and abutting at its edge against said shoulder, said flange being of greater thickness than the depth of said shoulder and providing a projection from the inner face of the bearing ring contiguous to the balls to retain said ring and balls in assembled relation.

2. In an open type anti-friction ball bearing, inner and outer bearing rings having races in their opposed faces, bearing balls engaged with said races, the race of the outer bearing ring being open on one side, and the inner face of said ring adjacent to the open side of the race having an annular shoulder thereon, and means for retaining a body of lubricant between the bearing rings at one side of the balls embodying a cup shaped retainer member of sheet metal having an outer cylindrical wall extending into said outer bearing ring in frictional contact with the face thereof and abutting against said shoulder, said cylindrical wall projecting inwardly from said shoulder at the open side of the ball race and contiguous to the balls to retain the bearing ring in assembled relation therewith, and said cylindrical wall having an extension forming a radial wall of said cup shaped retainer member positioned in a plane laterally spaced from the outer ring and having its inner edge disposed contiguous to but out of contact with the end of the inner bearing ring.

3. An anti-friction bearing unit including inner and outer bearing rings having races in their opposed faces, bearing balls engaged in said races, the ball race of the outer ring being open at one side thereof, and said inner ring being of greater width than the outer ring and extending laterally beyond one end of the latter, said end of the outer ring being counterbored to provide an internal annular shoulder at the open side of the ball race, and means for retaining a body of lubricant between said bearing rings in contact with the balls including a cup shaped sheet metal member having an outer cylindrical wall extending into said outer bearing ring and frictionally engaged with the face of the counterbore, said wall at its edge abutting against said shoulder and projecting inwardly to constitute a stop for contact with the bearing balls to retain the outer ring in assembled relation therewith said wall also extending outwardly beyond the lateral edge of said outer ring, and merging into the radially disposed end wall of the cup member, said radial wall surrounding the inner bearing ring in clearance relation to its periphery, and contiguous to the edge face of the laterally extending end of said inner bearing ring.

4. An anti-friction bearing unit including inner and outer bearing rings having races in their opposed faces, bearing balls engaged in said races, the ball race of the outer ring being open at one side thereof, and said inner ring being of greater width than the outer ring and extending laterally beyond one end of the latter, said end of the outer ring being counterbored to provide an internal annular shoulder at the open side of the ball race, and means for retaining a body of lubricant between said bearing rings in contact with the balls including a cup shaped sheet metal member having an outer cylindrical wall extending into said outer bearing ring and frictionally engaged with the face of the counterbore, said wall at its edge abutting against said shoulder and projecting inwardly to constitute a stop for contact with the bearing balls to retain the outer ring in assembled relation therewith, and the radial wall of said cup member being outwardly spaced from the end face of the outer bearing ring and having a central opening of greater diameter than the inner bearing ring and through which the laterally extending end of said bearing ring protrudes, a sealing ring or gasket or compressible material within said cup engaged with the periphery of the inner bearing ring, and a sheet metal retaining washer for said gasket superimposed thereon and having an annular flange on its outer edge frictionally coacting with the inner face of the cylindrical wall of said cup shaped member to retain said washer and the gasket in assembled relation therewith.

In testimony that I claim the foregoing as my invention, I have signed my name hereto.

GEORGE R. BOTT.